United States Patent [19]

Watanabe et al.

[11] 4,261,214
[45] Apr. 14, 1981

[54] CHAIN NOISE PREVENTING DEVICE

[75] Inventors: Masaki Watanabe, Niiza; Goroei Wakatsuki, Fujimi, both of Japan

[73] Assignee: Honda Giken Kogyo Kabushiki Kaisha, Tokyo, Japan

[21] Appl. No.: 909,517

[22] Filed: May 25, 1978

[30] Foreign Application Priority Data

Jun. 2, 1977 [JP] Japan .............. 52-71829[U]

[51] Int. Cl.³ .................. F16H 9/00; F16H 55/30
[52] U.S. Cl. ........................... 474/156; 474/151; 474/161
[58] Field of Search ....... 74/243 R, 243 DR, 243 PC, 74/243 S, 216.3, 217 C, 245 R, 245 S, 245 P

[56] References Cited

U.S. PATENT DOCUMENTS

| | | | |
|---|---|---|---|
| 527,153 | 10/1894 | Murphy et al. | 74/243 R |
| 975,938 | 11/1910 | Downey | 74/243 PC |
| 2,492,219 | 12/1949 | Haefeli | 74/243 PC |
| 2,596,501 | 5/1952 | Montgomery | 74/243 PC |
| 2,720,119 | 10/1955 | Sherman | 74/243 R |
| 2,953,930 | 9/1960 | Meyer | 74/243 PC |
| 3,057,219 | 10/1962 | Montgomery | 74/243 PC |
| 3,216,269 | 11/1965 | McCord | 74/243 PC |
| 3,257,860 | 6/1966 | Runde et al. | 74/243 PC |
| 3,504,562 | 4/1970 | Hirych | 74/243 R |
| 3,523,463 | 8/1970 | Van Thielen | 74/243 R |
| 3,666,322 | 5/1972 | Pickron | 74/243 R |
| 4,078,445 | 3/1978 | Kiser, Jr. | 74/243 R |
| 4,082,372 | 4/1978 | Kozuki | 74/243 R |
| 4,083,247 | 4/1978 | Umezaki et al. | 74/243 R |

FOREIGN PATENT DOCUMENTS

| | | | |
|---|---|---|---|
| 821304 | 11/1951 | Fed. Rep. of Germany | 74/243 PC |
| 1186486 | 8/1959 | France | 74/243 PC |
| 22425 | of 1896 | United Kingdom | 74/243 R |
| 719694 | 12/1954 | United Kingdom | 74/243 PC |

Primary Examiner—Leslie Braun
Attorney, Agent, or Firm—Irving M. Weiner; Pamela S. Burt; John L. Shortley

[57] ABSTRACT

A chain noise preventing device wherein a cushioning ring, having an outside diameter larger than that of a semicircular inscribed circle of chain formed when the chain meshes with a sprocket, is arranged on at least one side surface of the sprocket.

7 Claims, 15 Drawing Figures

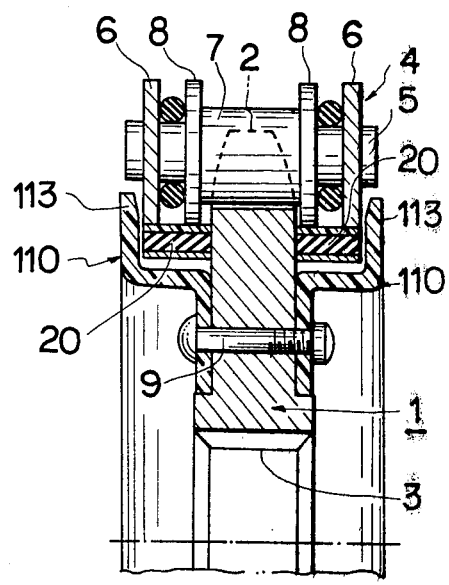
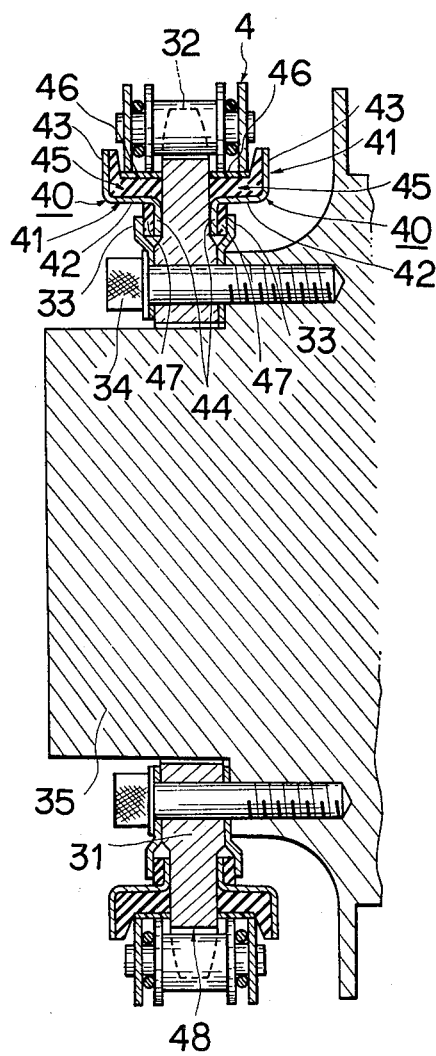
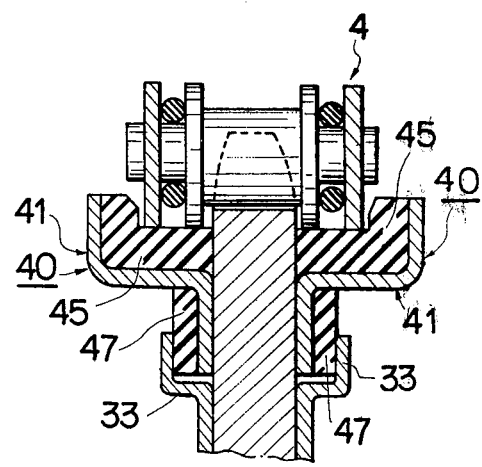

CHAIN NOISE PREVENTING DEVICE

The invention relates generally to a device for preventing chain noises generated when a chain meshes with a sprocket in a chain drive mechanism of a motorcycle or the like.

More particularly, the invention relates to a chain noise preventing device wherein cushion plate spring rings having an outside diameter larger than the inside diameter of a semicircular shaped portion of chain (the diameter of a semicircular inscribed circle), which is formed at the periphery of sprocket wheels when the chain meshes therewith, are arranged on the sides of a sprocket so that the shocks produced when the chain meshes with the sprocket may be absorbed and cushioned by the elastic flexure and cushioning action of the ring.

BACKGROUND OF THE INVENTION

In a chain drive mechanism of a motorcycle, when a chain which runs from a driven sprocket side meshes with a driving sprocket so as to be fed, the chain being somewhat, under tension is so quickly meshed with the teeth of the sprocket that a collision sound is generated. Since such collision is made between metal materials, the collision sound consists mostly of a high frequency component, and is called chain drive noise of the motorcycle, which is desired to be reduced.

In the sprocket on the driven side, the links of the chain on the relaxed side are meshed in turn according to the feed of the chain. However, immediately before this meshing, a clearance is formed between the chain and sprocket due to the relaxation of the chain. From this state, the chain collides suddenly with the teeth of the sprocket to thereby generate noises which are also called chain noise.

In conventional chain drive mechanisms as in a motorcycle or the like, such noises of collisions are generated on both the driving side and driven side due to the tension and relaxation of the chain when the chain meshes with the teeth of the sprocket.

Heretofore, as a means for preventing such chain noises, there has been proposed a means in which rubber or the like is provided on a sprocket by means, such a baking, so that the chain noises may be reduced by the cushioning action of the rubber. In such conventional means, because it is necessary to bake and fit rubber to the sprocket, there are disadvantages with respect to productivity and high cost. Also, because the rubber becomes integral with the sprocket, it will be compressed and deformed due to the driving force of the chain, and will be fatigued and worn early by the high temperature of friction heat generated between the chain and sprocket and by operation for a long time. Thus, there is difficulty with respect to durability, and lack of preventing noises.

SUMMARY OF THE INVENTION

The present invention provides a chain noise preventing device, including a sprocket, and a chain for meshing with the sprocket. The device also includes a cushioning ring having an outside diameter which is larger than the inside diameter of a semicircular shaped portion of the chain that is formed at the periphery of the sprocket when the chain meshes with the sprocket. The cushioning ring is disposed on at least one side surface of the sprocket.

An object of the invention is to provide a chain noise preventing device in which a cushioning ring of a diameter larger than the diameter of a semicircular inscribed circle of a chain formed at the periphery of a sprocket wheel when the chain meshes therewith is arranged at least on one side of the sprocket.

Another object is to provide a chain noise preventing device in which the cushioning ring is pressed on the pulling driving side of the chain to increase the diameter of the part on the other side of the ring, i.e., on the relaxing side of the chain, to thereby tension the chain on the relaxing side; to eliminate a backlash caused by the relaxation of the chain; to eliminate the meshing and engagement with the sprocket of the chain as relaxed; and to smoothly mesh the chain with the sprocket without relaxation of chain and collision shocks.

Another object is to provide a chain noise preventing device in which the cushioning ring is made as a plate spring ring having a cushioning material, such as hard rubber, so that when the chain on the relaxing side meshes with the sprocket the shocks may be absorbed and cushioned by the action of the plate, and the chain noises may be effectively reduced and prevented.

A further object is to provide a chain noise preventing device in which, when the chain meshes with the sprocket, the shocks are received by the cushioning material as well as the spring action of the spring ring; in contrast to a device utilizing only the compression and deformation of a rubber or the like.

A further object is to obtain a chain noise preventing device in which the ring is arranged on each side of the sprocket, and is supported by a member restricting the side to ensure the perfect function of the ring by preventing the same from sidewise escape.

Another object is to provide a chain noise preventing device including various improvements of the ring having such advantages that the noise preventing effect is positively obtained, and that it is excellent in durability.

A further object is to provide a chain noise preventing device including the improvements and suggestions of a holding member for the ring and of the protection of the chain.

BRIEF DESCRIPTION OF THE DRAWINGS

FIG. 8 is a view showing a modified embodiment of FIG. 2.

FIG. 9 is a sectioned view on line 9—9 in FIG. 1.

FIG. 10 is a view showing only an essential part of a modified embodiment of FIG. 9.

DETAILED DESCRIPTION OF THE PREFERRED EMBODIMENTS

Figure 1:
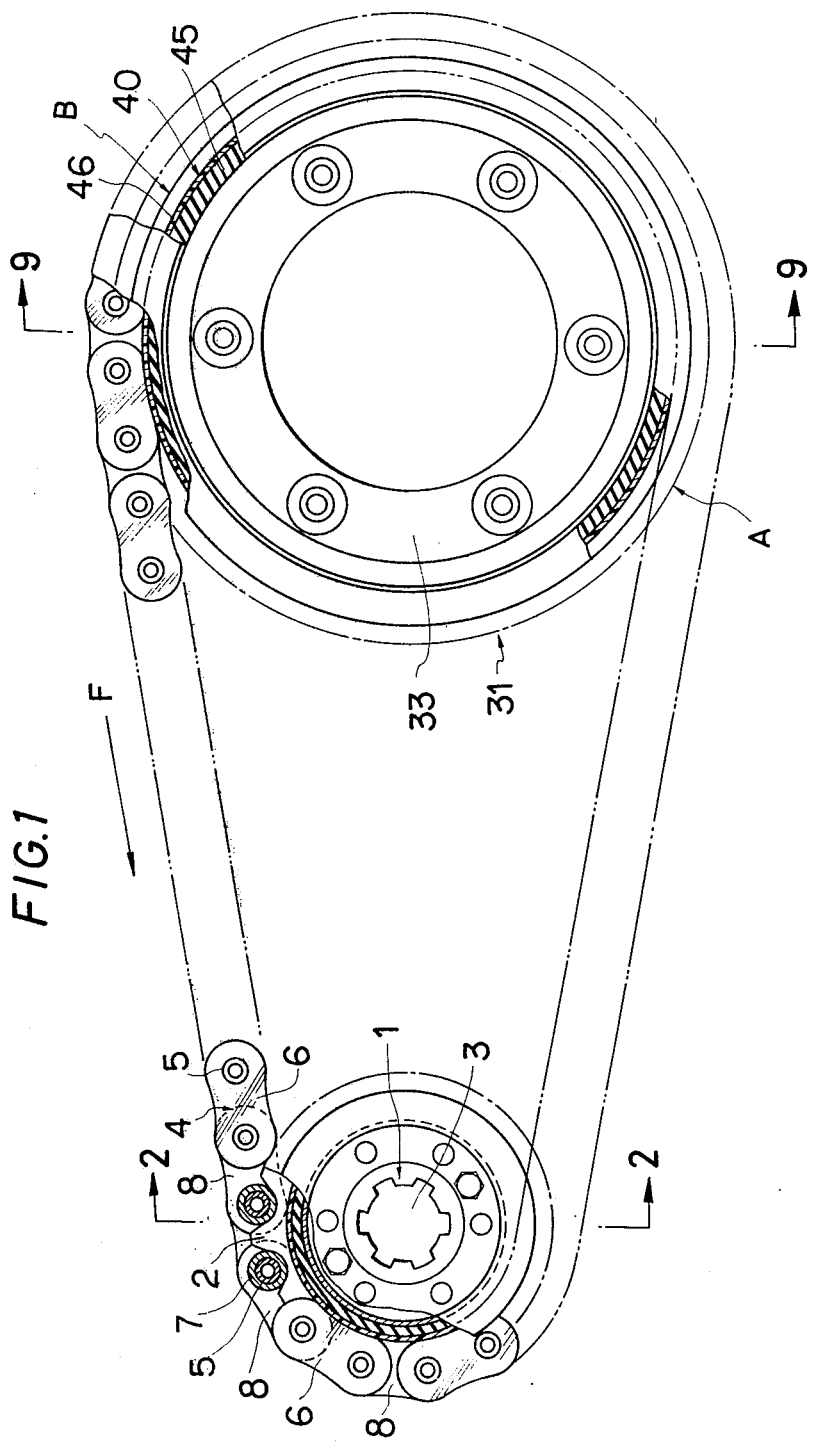
FIG. 1 is a side view of a chain drive mechanism including a chain noise preventing device according to the present invention.

Referring to FIG. 1, a driving sprocket 1 is provided radially with teeth 2 on its outer periphery and is secured and connected to a drive shaft (not shown) through a fitting hole 3 provided in its center. A chain 4 is endlessly wound and provided between driving sprocket 1 and driven sprocket 31.

Chain 4 consists of pins 5, outer links 6 connecting a pair of pins 5 with each other at both ends of the pins and inner links 8 connecting a pair of rollers 7 with each other, both of which are fitted to adjacent pins 5 of the adjacent outer links 6. The component members are connected in a loop to form chain 4.

Figure 2:
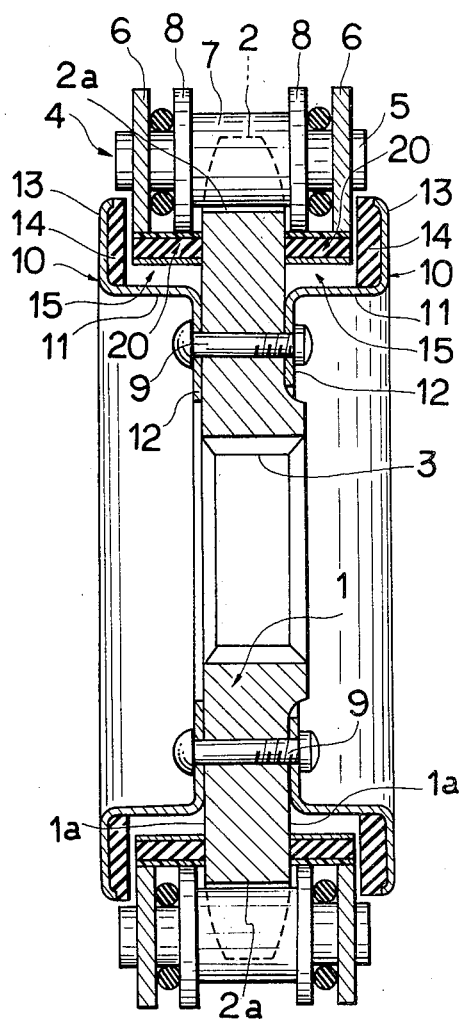
FIG. 2 is a sectioned view on line 2—2 in FIG. 1.

As clearly shown in FIG. 2, a pair of ring-shaped holding members 10 are integrally secured to sides 1a of sprocket 1 by connecting members 9, such as rivets or bolts. Each member 10 is integrally provided with a flange 11 extended sidewise of sprocket 1, a fitting edge 12 extended radially inwardly from the inner end of flange 11, and a retaining wall 13 extended radially outwardly at the outer end of flange 11. The parts are all integrally press-shaped from a steel plate material. Connecting members 9 cross in the width direction of sprocket 1 through the fitting edges 12.

Flange 11 in the width direction has a diameter much smaller than that of the tooth bottom part 2a of teeth 2. The outer periphery of retaining wall 13 projects radially outwardly from the level of tooth bottom part 2a. By means of holding member 10, a radially outwardly opened clearance 15 is formed over the entire periphery on both sides of the outer peripheral part of sprocket 1. A cushioning material 14, such as rubber or the like, is integrally disposed by means, such as baking or the like, on the inside surface of wall 13, i.e., on the inner surface opposed to the side face of the sprocket. By walls 13, the chain 4 is regulated in the sidewise direction, and a ring 20 is held therebetween.

In the above embodiment in FIGS. 1 and 2, the holding member 10 is formed from steel plate material, but may be formed from strengthened plastics.

As shown in FIG. 8, a holding member 110 is formed from strengthened plastics. Since member 110 is formed of plastics, at the time of a collision with the chain link, a large shock sound, as of metals themselves, will not be generated. No cushioning material is provided on the inside surface of the retaining wall 113 regulating the chain 4 in the sidewise direction.

Turning again to FIG. 2, a cushioning plate spring ring 20 is disposed in each ring-shaped clearance 15 formed in the vicinity of the outer periphery on each side of sprocket 1. The outside diameter of ring 20 is larger than the inside diameter of a semicircular portion of a chain (the diameter of an inscribed semicircle of a chain). Its width is smaller than the width of clearance 15.

Figure 3:
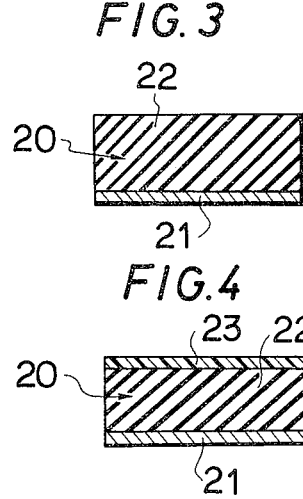
FIG. 3 is a magnified vertically sectioned elevation of a cushioning plate spring ring.

A body 21 of ring 20 is made by forming a spring steel plate to be ring-shaped. This ring-shaped spring steel body 21 is integrally coated on the surface, i.e., on its outer peripheral surface with a cushioning material 22 having flexibility and elasticity, such as hard rubber or plastics, which has a proper thickness. Such basic structure of ring 20 is shown in FIG. 3.

Figure 4:
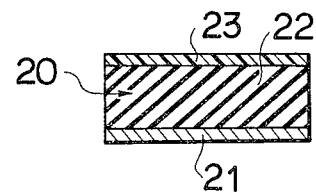
FIGS. 4 to 6 are views of modified embodiments of the above mentioned ring.

FIG. 4 shows that a friction reducing element 23 having a small friction coefficient and large mechanical strength, such as a synthetic resin, is integrally fitted, for example, by pasting, over the entire outer peripheral surface of cushioning material 22. The ring 20 in FIG. 4 is adopted to the embodiment of FIG. 2.

Figure 5:
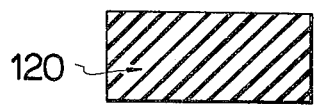
Figure 6:
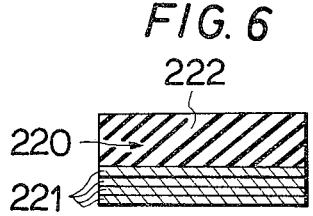
Figure 7:
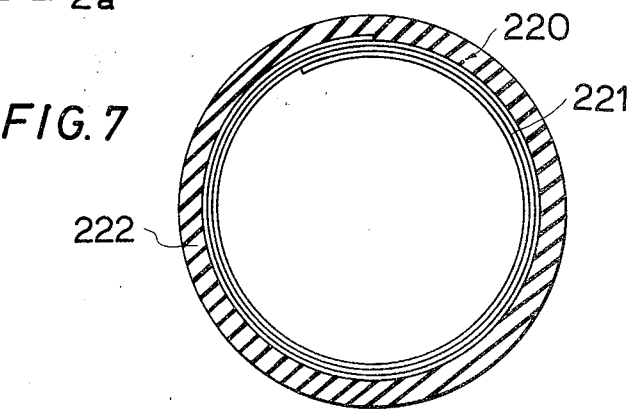
FIG. 7 is a vertically sectioned side view of the embodiment in FIG. 6.

FIGS. 5 and 6 shows further embodiments of the elastic ring.

In FIG. 5, a ring 120 is made from a uniform material which has spring characteristics as well as noise attenuation characteristics, such as a polyurethane rubber.

A ring 220 shown in FIG. 6 is formed with a multi-layer structure by spirally winding a body 221, with each layer being in close contact with each other, and is provided on the outer periphery of body 221 with a cushioning material 222 so that a high spring constant may be obtained and that the noise reducing effect may be improved.

In the previously described embodiments, body 21 has been explained as made of spring steel. However, in place thereof, nonmetal material such as strengthened plastics may be used to obtain the same spring characteristics as described above.

The operation of the device will now be described.

In FIG. 1, chain 4 is pulled and driven by the driving sprocket 1 in the direction indicated by the arrow F. When chain 4 meshes, the link of the chain first collides with the outer peripheral surface of ring 20 (FIG. 2) and, by this collision, ring 20 made of plate spring is pressed inwardly. Because ring 20 has an outside diameter larger than the diameter of a semicircular inscribed circle formed by the chain at the periphery of sprocket 1, the meshing shock of chain 4 tends to deform ring 20 against its spring force. However, ring 20 is already restricted by the links in the inside diameter part of the semicircle of the link chain, so that this part of the ring is not deformed further, but the other free part, i.e., non-restricted part, is expanded. The meshing collision energy of the chain is thus absorbed and cushioned by the resilient spring force and flexing action of ring 20 at the time of this meshing, and further by the cushioning material 22 on the outer periphery of the ring.

Thus, when chain 4 meshes with sprocket 1, the shock is effectively absorbed and cushioned by the multiplied action of the flexing action of ring 20 itself and the cushioning action of the cushioning material. After meshing, ring 20 rotates in the same direction with chain 4 being restricted in the inside diameter part of the links of the chain.

Because the cushioning plate spring ring 20 has a diameter larger than that of the bottom part of clearance 15, i.e., flange 11 of the holding member, and is different in its peripheral length, it is free in a small range; has a slightly different relative velocity than the chain; wears uniformly; and is prevented from being partially worn.

The noise preventing means described above is applied also to driven sprocket 31. In general, the driven sprocket begins to mesh, in the meshing starting position A, with the chain fed out of sprocket 1, relaxed and expanded downwardly. Since the relaxed chain links mesh quickly with teeth 32 of sprocket 31, noises are generated by the collision and the pulling and beating of the link themselves. Therefore, it is desired to provide the same cushioning ring as described above.

FIG. 9 is a sectioned view on line 9—9 in FIG. 1, showing the driven sprocket side.

A cushioning ring 40 includes a ring body 41 which is L-shaped in cross-section, a flange 42, a retaining wall 43, and a supporting edge 44 contacting the side of sprocket 31 and extended inwardly and press-shaped from spring steel. A cushioning material 45, such as hard rubber, is secured to both the upper surface of flange 42 and the inside surface of wall 43. A friction reducing element 46 is pasted to the part contacting the links on the bottom of material 45. Ring 40 is arranged in the vicinity of the peripheral edge of sprocket 31 in the same manner as previously described.

A holding member 33 expanded out sidewise is provided adjacent to the inside edge of sprocket 31, and is connected together with sprocket 31 to a hub 35 by bolts 34. Edge 44 is inserted and carried between member 33 and the side surface of sprocket 31. A cushioning material 47 is integrally secured to the outside surface of edge 44. Therefore, ring 40 is free in its radial motion in a predetermined range while being prevented from escaping sidewise.

The chain meshes with sprocket 31 in position A shown in FIG. 1. When the chain meshes, the shock is absorbed and cushioned by the flexing and cushioning action of ring 40 having a diameter larger than the inside diameter of the semicircular chain of the links positioned at the periphery of the sprocket.

Because ring 40 has a diameter larger than that of the semicircular inscribed circle formed by the chain links as described above, the ring restricted in the part B diagonally positioned ahead of starting position A is expanded out toward position A by the pressing action of the chain fed, and rotates with a clearance 48 (FIG. 9) being generated between same and the sprocket. Therefore, at the time of meshing and engaging with the teeth on the relaxed side of the chain, the chain does not directly mesh, but rather the links first collide with material 45 to cushion the shock and gradually mesh with the teeth 32 as the rotation continues. Thus, on the driven sprocket side, the chain meshes gradually while being tensioned by the ring.

When the links mesh with sprocket 31, the generation of noises is controlled and prevented by biased expansion of the ring, tension of the chain, cushioning action of the cushioning material, and preventing rapid meshing of the chain before meshing on the relaxed side of the chain.

In the embodiment in FIG. 10, the friction reducing element on the surface of material 45 is removed.

Figure 11:
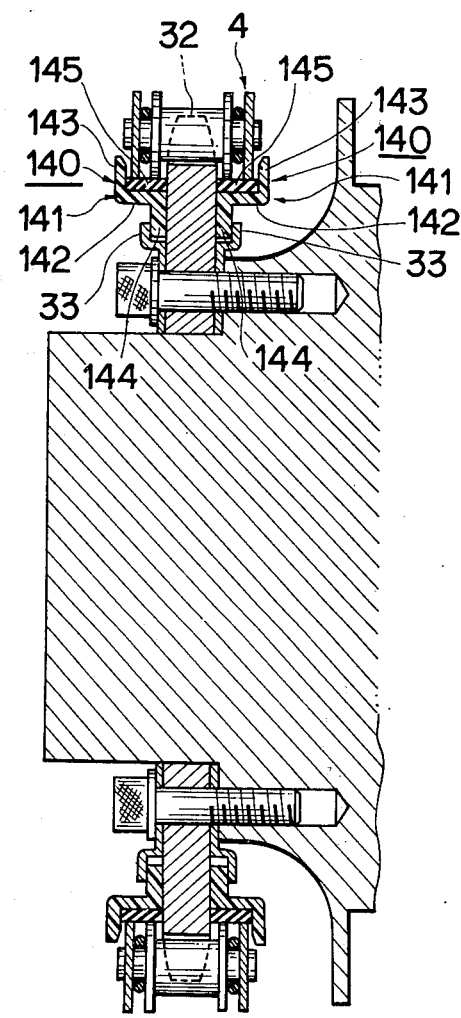
FIG. 11 is a view showing a further modified embodiment of FIG. 9.

In the embodiment in FIG. 11, the cushioning ring 140 is formed from strengthened plastics having a predetermined elasticity.

A body 141 of ring 140 is formed to be ring-shaped of strengthened plastics so as to be made in the same cross-sectional shape as described above. A cushioning material 145 is not provided on the inside surface of a retaining wall 143, but is provided only on the bottom surface of a flange 142. A supporting edge 144 held by holding member 33 is not provided on the side with a cushioning material, but depends on the friction reducing action between edge 144 and member 33.

Figure 12:
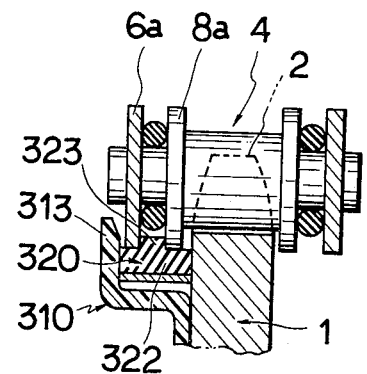
FIGS. 12 and 13 are views of only an essential part, showing embodiments in which the above mentioned ring is provided only on one side of a drive and driven sprocket.
Figure 13:
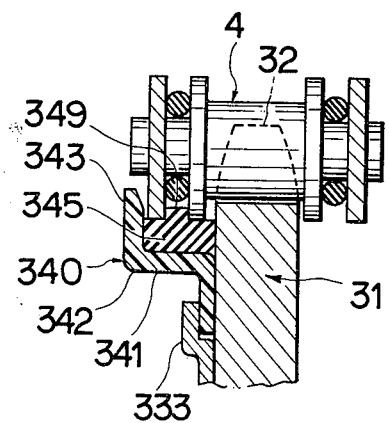

FIGS. 12 and 13 show embodiments each provided on one side of a sprocket with a cushioning spring ring.

The embodiment in FIG. 12 shows the driving side. A holding member 310 is provided on only one side surface of sprocket 1. A cushioning plate spring ring 320 is interposed between a retaining wall 313 and said one side surface of the sprocket. A projection 323, disposed in a clearance between links 6a and 8a on one side of the chain, projects from the surface of cushioning material 322 of ring 320.

The embodiment in FIG. 13 shows the driven sprocket 31 side. A cushioning ring 340 is arranged on only one side surface of sprocket 31, and a holding member 333 is also arranged only on the same side surface. A projection 349 is provided on the surface of cushioning material 345 disposed on the bottom of a flange 342 of the body 341 of ring 340.

Figure 14:
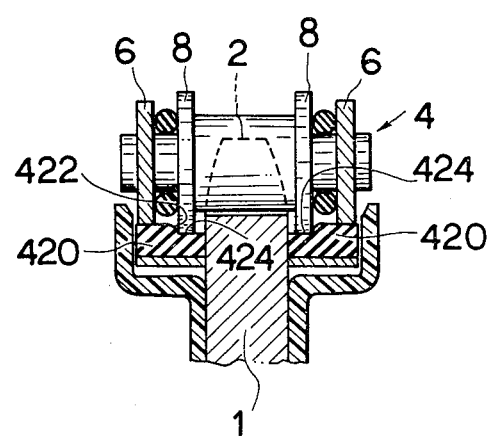
FIG. 14 is a view showing an embodiment in which the inside and outside chain links are different from each other.
Figure 15:
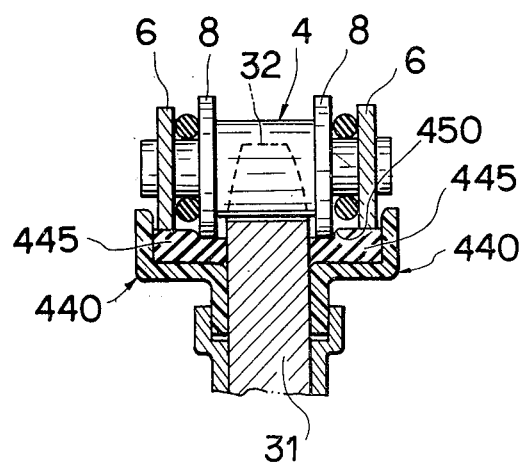
FIG. 15 is a view of a further modified embodiment.

FIGS. 14 and 15 show embodiments in each of which the link plates 6 and 8 are different in height, viz., the outside link plate 6 is lower than the inside one 8.

FIG. 14 shows the driving sprocket side. A step part 424 corresponding to the height difference between plates 6 and 8 is provided on the surface of a cushioning material 422 of a cushioning plate spring ring 420.

FIG. 15 shows the driven sprocket side. A step part 450 is provided on the surface of a cushioning material 445 provided in a cushioning ring 440 so as to correspond to the height difference between the link plates 6 and 8.

We claim:

1. A chain noise preventing device, comprising:
   a sprocket (1);
   a chain (4) having central portions which mesh with said sprocket (1), and link plates (6,8) which are disposed on both sides of said sprocket (1);
   a holding member integrally secured to the side surface of said sprocket (1) and comprising a flange and a retaining wall (13), said flange (11) extending sidewise of said sprocket (1) and having a diameter which is smaller than the diameter of a circle defined by a tooth bottom portion (2a) of said sprocket (1), said retaining wall extending radially from an outer end of said flange (11) over said circle defined by said tooth bottom portion (2a) of said sprocket (1);
   a cushioning ring (20) movably arranged between said link plates (6,8) of said chain (4) and said holding member (10), and having an outside diameter which is larger than an inscribed semicircle defined by the meshing of said chain (4) with said sprocket (1), and being rotatable in cushioning engagement with said link plates (6,8);
   a clearance (15) defined between the side surfaces of said sprocket (1) and said holding member (10), the width of said clearance (15) defined between the side surface of said sprocket (1) and said retaining wall (13) of said holding member (10) being larger than that of said cushioning ring (20) so as to permit the free rotation of said cushioning ring (20); and
   said retaining wall (13) of said holding member (10) being adapted to limit the sidewise movement of said chain (4) and said cushioning ring (20).

2. A chain noise preventing device according to claim 1, wherein:
   said retaining wall of said holding member is integrally provided on the inside thereof with a cushioning material which is adapted to reduce the shock resulting from collision of said link plates of said chain against said retaining wall.

3. A chain noise preventing device according to claim 1, wherein:
   said retaining wall of said holding member is made of cushioning material so as to reduce the shock resulting from collision of said link plates of said chain against said retaining wall.

4. A chain noise preventing device according to claim 1, wherein:
   said cushioning ring is integrally provided over the entire periphery thereof with a friction reduction element having a small friction coefficient and great mechanical strength.

5. A chain noise preventing device according to claim 1, wherein:
   said link plates of said chain comprise inside and outside plates; and
   said cushioning ring has a projection for fitting in a clearance defined by said inside and outside link plates.

6. A chain noise preventing device according to claim 1, wherein:
   said link plates of said chain comprise inside and outside plates which differ in height from each other; and
   said cushioning ring has a step which corresponds to the height difference between said inside and outside link plates.

7. A chain noise preventing device, comprising:
   a sprocket;
   a chain having central portions which mesh with said sprocket, and inside and outside link plates which are disposed on both sides of said sprocket;
   a holding member including a flange having a diameter which is smaller than the diameter of a circle defined by a tooth bottom portion of said sprocket, said holding member further including a retaining wall extending radially from an outer end of said flange over said circle defined by said tooth bottom portion of said sprocket;
   a cushioning ring having an outside diameter which is larger than an inner semicircle defined by the meshing of said chain with said sprocket, and having an inside diameter which is larger than the outside diameter of said flange of said holding member;
   said cushioning ring being made from a resilient material;
   said cushioning ring being made from a spring steel material;
   said cushioning ring being provided with a rubber ring portion integrally secured to the outer peripheral surface of said cushioning ring; and
   a projection (349), fitting in a clearance between said inside and outside link plates of said chain, being provided on the surface of said rubber ring portion of said cushioning ring.

* * * * *